United States Patent [19]
McClymont et al.

[11] 3,883,875
[45] May 13, 1975

[54] ENDFIRE COMMUTATED ANTENNA ARRAY

[75] Inventors: Ian W. McClymont; Sharad V. Parekh, both of Harlow, England

[73] Assignee: International Standard Electric Corporation, New York, N.Y.

[22] Filed: Jan. 2, 1974

[21] Appl. No.: 429,956

[52] U.S. Cl. .......... 343/106 D; 343/108 M; 343/876
[51] Int. Cl. .............................................. G01s 1/38
[58] Field of Search..... 343/106 D, 108 M, 113 DE, 343/876

[56] References Cited
UNITED STATES PATENTS
3,047,864   7/1962   Byatt ............................ 343/113 DE
3,054,105   9/1962   Steiner et al. ..................... 343/106 D Primary Examiner—Maynard R. Wilbur
Assistant Examiner—Richard E. Berger
Attorney, Agent, or Firm—William T. O'Neil

[57] ABSTRACT

A commutated linear antenna array of general utility in simulated Doppler guidance systems. The array operates as an entire array of n elements in which n-1 elements are successively excited in accordance with a commutation (scan) program. As each element is excited, the immediately adjacent element to the rear (opposite the radiation direction) has a base loading circuit activated such that it acts as a short circuit and therefore the element itself acts as a reflector in cooperation with the excited element. At the same time all other elements are provided with base loadings so that they are open circuited and appear transparent for radiation purposes. A dummy parasite reflector is provided behind the first element of the array (not commutated) and has a fixed short-circuit loading at its base. Thus the radiation pattern is substantially the same in the forward direction during the successive exitation of each of the commutated elements.

5 Claims, 1 Drawing Figure

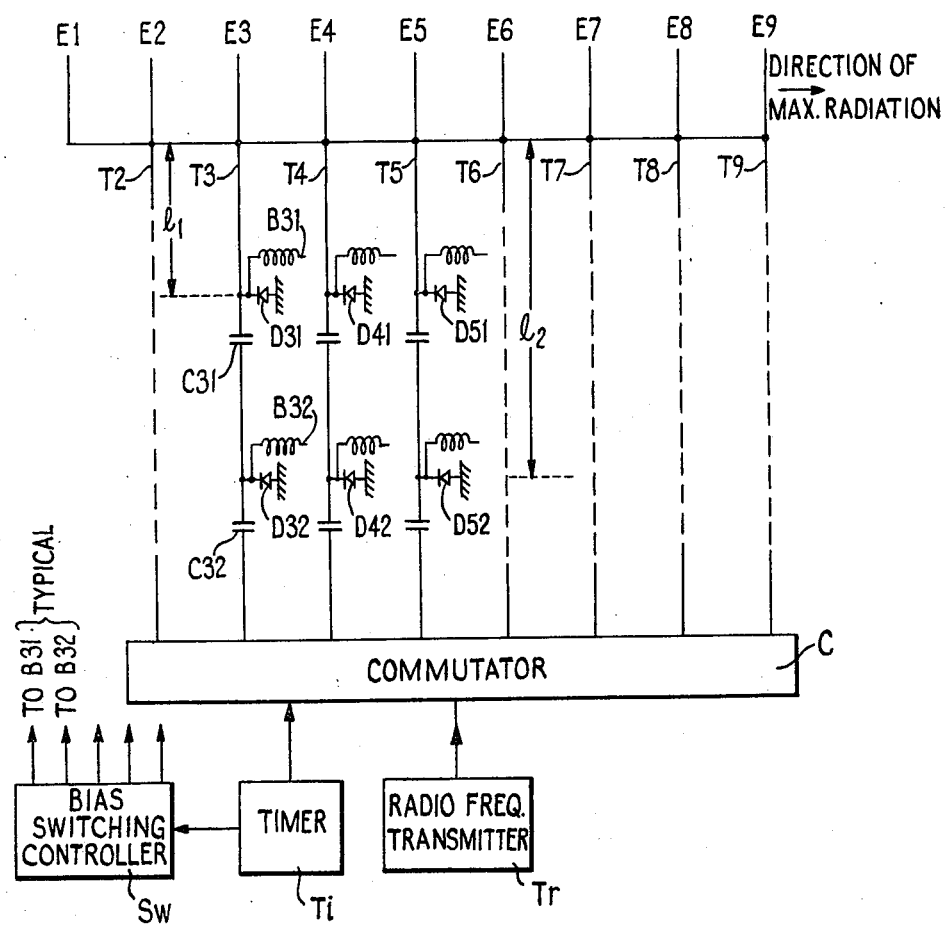

ENDFIRE COMMUTATED ANTENNA ARRAY

BACKGROUND OF THE INVENTION

1. Field of the Invention

This invention relates to antenna arrays generally and more particularily to linear arrays adapted for commutation in a simulated Doppler ground beacon guidance system.

2. Description of the Prior Art

Prior Art systems of the simulated Doppler type are well known in this art. British Pat. No. 1,225,190, U.S. Pat. application Ser. No. 4,653 filed Jan. 21, 1970, now U.S. Pat. No. 3,670,337, and U.S. Pat. application Ser. No. 210,699, filed Dec. 21, 1971, now U.S. Pat. No. 3,728,729, describe various aspects of Doppler radio navigation beacons which operate by commutation of RF energy successively through the elements of an array of radiators to simulate constant velocity motion of a single radiator. A reference antenna (fixed with respect to the commutated Doppler array) radiates a reference signal off-set in frequency with respect to the commutated radiation. This provides a signal in space from which the remote station (approaching aircraft receiver, for example) can extract a beat frequency signal which varies with the cosine of the angular approach path (angle of reception) displacement with respect to the line of the commutated array. From this basic information, navigational information is air-derived, and the commutated ground antenna and its related transmitting equipment is often referred to as a Doppler beacon.

In such ground beacon arrays where one radiator element is excited at any one time, environmental factors including the quiescent elements of the array affect the excited element radiation pattern. This effect is particularly noticeable with a small array thus producing an undesirable effect on the signal processing circuits at the airborne receiver as a result of the variable radiation pattern throughout each commutation cycle.

The manner in which the present invention improves upon such commutated antenna arrays will be understood as this description proceeds.

SUMMARY

It may be said to have been the general objective of the present invention to provide a commutatable antenna generally useful in Doppler ground beacon systems and having a radiation pattern from each of the excited elements which is substantially the same as that provided by each other element.

According to the invention, an antenna arrangement is provided which comprises a linear array of n radiator elements. Transmitting means are provided for exciting each of the $n-1$ of said elements in turn; an electronic or mechanical commutator providing for the successive exitation in accordance with a predetermined program. A permanently nonexcited element is located at one end of the array (opposite extreme from the direction of radiation). Means are provided for short-circuiting and open-circuiting each of $n-1$ elements. The aforementioned short and open-circuiting means is operated in such a manner that during exitation of any one of said elements the element adjacent to the rear of the excited element operates as a reflector and the remaining $n-2$ elements remain open-circuited and therefore electrically transparent.

The details of the manner in which the present invention accomplishes these results will be understood as this description proceeds.

BRIEF DESCRIPTION OF THE DRAWINGS

A single FIGURE shows a detailed circuit of the actual short and open circuiting means at the array elements, and other related components for a system according to the invention.

DESCRIPTION OF THE PREFERRED EMBODIMENT

Referring now to the FIGURE, a plurality of elements E1 through E9 comprises an array with a direction of radiation as indicated. A typical antenna of this type operated in the vicinity of 5 GHz, which is a suitable frequency for Doppler beacon air navigation use. In the typical implementation at that frequency, a front-to-back ratio of about 10 decibels and a sector coverage of about ±60° about bore sight were achieved. Throughout this sector, the radiator pattern varied from element to element by not more than + 1 decibel.

In the FIGURE, the antenna comprises (for example) a linear array of nine monopole elements E1 to E9. The elements E2 to E9 are connected by respective transmittion line sections T2 through T9 to a commutator C. The aforementioned elements E1 through E9 are equally spaced by one quarter wavelength at the operating frequency. The base of the element E1 is permanently short-circuited, as by a half wavelength of transmission line ending with a ground connection.

Each of the commutator branch transmission lines contains two shunt PIN diodes, typically D31 and D32 for line T3, with associated negative bias inputs B31 and B32, and DC blocking capacitors C31 and C32.

The length of transmission line between each "outer diode" such as D31, and the base of the respective element E3, will hereinafter be referred to as $l_1$ and is an even number of quarter wave lengths. The length of the transmission line between each "inner" diode such as D32 etc. and the base of the respective element, E3 etc. will hereinafter be referred to as $l_2$ and is an odd number of quarter wave lengths.

Thus, for each commutator branch, the 'outer' diode, e.g. D31, when biased "on" will short-circuit the transmission line T3, and this short-circuit is transformed by $l_1$ to short-circuit the respective element, e.g. E3. With the 'outer' diode, e.g. D31 biased off and the 'inner' diode, e.g. D32 biased on, the resulting short circuit on the transmission line is transformed by $l_2$ to open-circuit the respective element, e.g. E3. When both diodes of a transmission line are biased off, the associated element will radiate if excited by the commutator.

Assuming the commutator to be sequenced to excite the elements E2 to E9 in that order, i.e., in the forward direction of the antenna, there is sequential switching of the PIN diodes such that, both diodes on the energized commutator branch are biased off so that the element radiates, and contemporaneously the "outer" diode and the "inner" diode on the commutator branch adjacent and behind (opposite the scanning direction) the energized commutator branch are biased respectively on and off, while then the "outer" diode and the "inner" diode on the remaining commutator branches are biased respectively off and on.

For the sake of further clarification, if element E4 is excited (diodes D41 and D42 off), a base loading on element E3 is provided (diode D31 on, diode D32 off) so that it is a short-circuit. This means that element E3 momentarily acts as a passive monopole reflector. A base loading on element E5 is provided (diode D51 off, diode D52 on) so that it is an open circuit. In like manner the remaining elements E2, E6, E7, E8 and E9 are open circuited. Accordingly element E4 is coupled strongly only to element E3 and the other elements act as if they were transparent.

In the FIGURE a conventional RF transmitter Tr is shown. This unit operates essentially CW, and accordingly the commutator C parcels this transmitter signal out sequentially. Each commutator output terminal supplies a square wave (or substantially square) envelope having a duty cycle equal to $1/n - 1$. A basic timer would normally provide this cadence for the commutator and also for the bias switching controller, SW.

It will be understood that this unit SW contains the internal logic circuits necessary to stagger the bias gating for the point B31 and B32, and the corresponding bias points for the other monopole and transmission line sub-combinations. The units Tr and Ti are themselves well known in this art and instrumentation of SW will be obvious to those skilled in this art.

It will be realized by those of skill in this art that the functions of SW, Ti, C could be combined in one mechanical, electronic or electro-mechanical device.

The sequential switching of the PIN diodes is therefore arranged so that for any radiating element, the element behind it is short-circuited and all other elements are open-circuited. The element E1 (of the same dimensions as the commutated elements) functions as a dummy parasite reflector behind the element E2. Since any excited element couples substantially only to its adjacent back element, the scan by other elements as they are excited in turn will thus give rise to a set of nearly identical radiation patterns.

As a variation of the arrangement, the element E1 may be short-circuited at the appropriate time to act as a reflector by having connected to its base a length of transmission line with a shunt PIN outer diode which is biased on in the correct switching sequence, instead of having the fixed short-circuit loading aforementioned.

Circulators coupled to appropriate lengths of transmission line may also be used instead of shunt diodes to short-circuit or open circuit the commutated elements in the switching sequence described above. The so-called "isoductor," a ferrite-type controlled circulator is suitable for such use.

It is to be understood that the foregoing description of specific examples of this invention is made by way of example only and is not to be considered as a limitation on its scope. Other variations on the arrangement falling within the spirit of the invention will suggest themselves to those skilled in this art once the inventive concepts are fully appreciated.

What is claimed is:

1. A Doppler navigation beacon system having a commutated linear array of $n$ radiator elements for radiating in substantially equal radiation patterns during the successive excitation of corresponding elements of said array, comprising the combination of:

transmitter means for generating a radio frequency signal;

radio frequency energy commutator means for discretely switching said radio frequency signal among at least a first portion of said elements according to a predetermined sequence, said elements thereby becoming driven elements;

and switching means operating synchronously with said commutator means, for causing an element of said array adjacent to the driven element at any time, to act as a reflecting element, said switching means also operating to cause a second portion of the other elements of said array to be substantially electrically transparent, said driven elements thereby providing substantially equal radiation patterns maximized in the direction opposite said reflecting element with respect to each excited element.

2. Apparatus according to claim 1 in which said array includes one electrically fixed element at the end of said array opposite said direction maximum radiation, said fixed element being electrically connected to always act as a reflector; in which the other $n - 1$ of said elements are sequentially energized through $n - 1$ outputs of said commutator; and in which said other elements which are electrically transparent at any time are $n - 2$ in number.

3. Apparatus according to claim 2, in which said $n$ radiator elements are monopoles spaced from each other by one quarter wavelength at the excitation frequency.

4. Apparatus according to claim 3 in which said $n - 1$ radiators controlled by said commutator are each connected to said commutator by transmission lines each comprising a first section having a length of an even number of quarter wavelengths and a second section an odd number of quarter wavelengths long, said first section extending from said corresponding monopole to an outer control point and said second section extending from said outer control point to an inner control point, said inner control point being connected to said commutator by a further length of transmission line;

and first shorting RF means responsive to said switching means are included for short circuiting said outer control point to ground to effect short circuiting of the base of the corresponding monopole, and second RF shorting means also responsive to said switching means are included for short circuiting said inner control point.

5. Apparatus according to claim 4 in which said first and second shorting means comprise PIN diodes, said switching means are arranged to bias only said first shorting means into RF conduction to cause the corresponding monopole to act as a reflector, said switching means are also arranged to bias only said second shorting means into RF conduction to cause said corresponding monopole to appear electrically transparent, and said switching means are also arranged to bias both said first and second shorting means out of conduction during the time said commutator energizes said corresponding monopole.

* * * * *